United States Patent [19]

Hong et al.

[11] Patent Number: 5,764,799

[45] Date of Patent: Jun. 9, 1998

[54] OCR METHOD AND APPARATUS USING IMAGE EQUIVALENTS

[75] Inventors: Tao Hong, Buffalo; Jonathan J. Hull, Williamsville, both of N.Y.

[73] Assignee: Research Foundation of State of State of New York, Albany, N.Y.

[21] Appl. No.: 494,337

[22] Filed: Jun. 26, 1995

[51] Int. Cl.[6] .............................. G06K 9/68; G06K 9/62; G06K 9/72

[52] U.S. Cl. .......................... 382/225; 382/218; 382/229

[58] Field of Search ................................ 382/187, 229, 382/217, 230, 221, 225, 218, 309, 310, 311, 177

[56] References Cited

U.S. PATENT DOCUMENTS

| | | | |
|---|---|---|---|
| 4,355,302 | 10/1982 | Aldefeld et al. | 395/2.52 |
| 4,610,025 | 9/1986 | Blum et al. | 382/173 |
| 4,799,271 | 1/1989 | Nagasawa et al. | 382/231 |
| 5,278,918 | 1/1994 | Bernzott et al. | 382/176 |
| 5,278,920 | 1/1994 | Bernzott et al. | 382/176 |
| 5,325,444 | 6/1994 | Cass et al. | 382/173 |
| 5,327,342 | 7/1994 | Roy | 395/167 |
| 5,410,611 | 4/1995 | Huttenlocher et al. | 382/173 |
| 5,519,786 | 5/1996 | Courtney et al. | 382/159 |

Primary Examiner—Yon J. Couso
Assistant Examiner—Ha Tran Nguyen
Attorney, Agent, or Firm—Jaeckle Fleischmann & Mugel, LLP

[57] ABSTRACT

An OCR 300 stores signals representative of reference characters and scans a document 302 to generate a bit mapped digitized image of the document. After the characters and the words are recognized and candidate characters are identified, the initial results are post-processed to compare clusters of identical images to the candidates. Where the candidates of all equivalent images in a cluster are the same, the candidates are output as representative of the image on the document. Where the candidates are different, a majority of identical candidates determines the recognized candidates. Other post-processing operations include verification and re-recognition.

24 Claims, 12 Drawing Sheets

| 1 | 2 | 3 | 4 | 5 | 6 | 7 |
|---|---|---|---|---|---|---|
| Please 0.90 | fin 0.33 | in 0.30 | tire 0.80 | application 0.90 | farm 0.35 | . |
| Fleece 0.05 | fill 0.30 | In 0.28 | toe 0.10 | applicators 0.05 | form 0.30 | |
| Pierce 0.02 | flu 0.21 | lo 0.25 | lire 0.05 | acquisition 0.03 | forth 0.20 | |
| Fierce 0.02 | flit 0.10 | ill 0.13 | the 0.03 | duplication 0.01 | foam 0.11 | |
| Pieces 0.01 | till 0.06 | Io 0.04 | Ike 0.02 | implication 0.01 | force 0.04 | |

FIG. 1

Sentence 1

| 1 | 2 | 3 | 4 | 5 | 6 | 7 | 8 | 9 | 10 |
|---|---|---|---|---|---|---|---|---|----|
| This | farm | is | almost | the | same | as | that | one | : |
|  | form |  |  |  |  |  |  |  |  |
|  | forth |  |  |  |  |  |  |  |  |
|  | foam |  |  |  |  |  |  |  |  |
|  | force |  |  |  |  |  |  |  |  |

Sentence 2

| 11 | 12 | 13 | 14 | 15 | 16 | 17 |
|----|----|----|----|----|----|----|
| Please | fill | in | the | application | farm | ! |
|  |  |  |  |  | form |  |
|  |  |  |  |  | forth |  |
|  |  |  |  |  | foam |  |
|  |  |  |  |  | force |  |

FIG. 2

① surface / surface    $W_1 \approx W_2$

② mathematical / the / mathematically / mathematical    $W_2 \approx \text{subimage\_of}(W_1)$ ③ consider / constant    $\text{left\_part\_of}(W_1) \approx \text{left\_part\_of}(W_2)$ ④ knowing / ring    $\text{right\_part\_of}(W_1) \approx \text{right\_part\_of}(W_2)$ ⑤ further / there    $\text{right\_part\_of}(W_1) \approx \text{right\_part\_of}(W_2)$ ⑥ mathematically / images    $\text{subimage\_of}(W_1) \approx \text{subimage\_of}(W_2)$

FIG. 4 skill; it is (biologically) based. Language is something we (are) born (know)ing how to (know). Yet (the) hypothesis that (the)re (are) (biological) underpinnings to human linguistic ability does not explain everything. There may indeed

•••••• versal elements. All (know)n languages sh(are) cetain organizational principles.

FIG. 5 extract all word images from the text image
601 set QUEUE as an empty set
602 put all word images into QUEUE
603 set IMAGE-CLUSTER-LIST as an empty set
604 while QUEUE not empty do
    605 pop an image I from QUEUE
    606 if image I matches with the prototype of a cluster in IMAGE-CLUSTER-LIST
        then
        607 add image image I as a new member of that image cluster
    608 else if
        create a new image cluster with image I
        add it into IMAGE-CLUSTER-LIST
    end if
end while

FIG. 6

```
Word Image Clustering (see FIG. 6 for detail)
701 sort clusters in IMAGE-CLUSTER-LIST by increasing order of the width
    of their prototypes
702 while IMAGE-CLUSTER-LIST has more than one cluster do
    703 pop a cluster C from IMAGE-CLUSTER-LIST
    704 for each cluster D in IMAGE-CLUSTER-LIST do
        705 if IsSubImage (prototype of C, prototype of D)
            then
            706 for each word image x in cluster C do
                707 for each word image y in cluster D
                    do
                    x is a subpattern of y
                end for
            end for
        end if
    end for
end while
```

FIG. 7

IsSubImage (Image1, Image2) {Image1:$m_1 \times n_1$, Image2:$m_2 \times n_2$}

801 if $m_1 \geq m_2$ 802 then 803 return (FALSE)

804 else if found ← FALSE 805 for ( x ← o; x $\leq m_2 - m_1$; x++ )

extract the region of Image2, start at (x, 0), end at (x + $m_1$, $n_2$)

806 if Image1 and the Region of Image2 match 807 then found ← TRUE break end if end if return (found)

FIG. 8

```
Left_Part_Of (Image1, Image2) {find maximal match}
901 {Image: m₁ x n₁, Image2: m₂ x n₂}
    leftside ← 0
    rightside ← Min (m₁, m₂)
    {binary search}
902 while (leftside < rightside) do
        middle ← (leftside + rightside)/2
        extract left regions of Image1 and Image2 with width middle
903     if image regions match
904     then
            leftside ← middle
905     else
            rightside ← middle
906     end if
907 end while
    match_region_width ← leftside
908 if match_region_width > 0
909 then
        return (TRUE)
910 else
        return (FALSE)
```

FIG. 9

| IMAGE | OCR | Verification |
|-------|-----|--------------|
| the | the | the |
| the | die → | the |
| the | the | the |
| the | the | the |
| the | the | the |
| the | the | the |

OCR METHOD AND APPARATUS USING IMAGE EQUIVALENTS

This application relates in general to optical character recognition (OCR) equipment, and, in particular, to an OCR using image equivalents.

SUMMARY

The objective of visual text recognition is to transform correctly an arbitrary image of text into its symbolic equivalent. Recent technical advances in the area of document recognition have made automatic text recognition a viable alternative to manual key entry. Given a high quality text page, a commercial document recognition system can recognize the words on the page at a high correct rate. However, given a degraded text page, such as a multiple-generation photocopy or facsimile, performance usually drops abruptly.

Given a degraded text image, word images can be extracted after layout analysis. A word image from a degraded text page may have touching characters, broken characters, distorted or blurred characters, which may make the word image difficult to recognize accurately. After character recognition and correction based on dictionary look-up, a word recognizer will provide one or more word candidates for each word image. The OCR generates a set of candidates, each with a confidence score. FIG. 1 lists the word candidate sets for the sentence, "Please fill in the application form." The confidence score may not be reliable because of noise in the image. The correct word candidate is usually in the candidate set, but may not be the candidate with the highest confidence score. Instead of simply choosing the word candidate with the highest recognition score, which may make the correct rate quite low, it is desirable to have a method which can select a candidate for each word image so that the correct rate can be as high as possible.

Contextual information and high-level knowledge can be used to select a decision word for each word image in its context. Currently, there are two approaches, the statistical approach and the structural approach, to solving the problem of candidate selection. In the statistical approach, language models and word collocation can be utilized for candidate selection. In the structural approach, lattice parsing techniques have been developed for candidate selection.

The contextual constraints considered in a statistical language model, such as word collocation, are local constraints. For a word image, a candidate is selected according to the candidate information from its neighboring word images in a fixed window size. The window size is usually set as one or two. In the lattice parsing method, a grammar is used to select a candidate for each word image inside a sentence so that the sequence of those selected candidates form a grammatical and meaningful sentence. For example, consider the sentence "Please fill in the application form". We assume all words except the word "form" have been recognized correctly and the candidate set for the word "form" is {farm, form, forth, foam, forth} (see the second sentence in FIG. 2). The candidate "form" can be selected easily because the collocation between "application" and "form" is strong and the resulting sentence is grammatical.

The contextual information inside a small window or inside a sentence sometimes may not be enough to select a candidate correctly. For example, consider the sentence "This form is almost the same as that one" (see the first sentence in FIG. 2). Word image 16 has five candidates: {farm, form, forth, foam, forth}. After lattice parsing, the candidate "forth" will be removed because it does not fit the context. But it is difficult to select a candidate from "farm, form" "foam" and "force" because each of them makes the sentence grammatical and meaningful. In such a case, more contextual constraints are needed to distinguish the remaining candidates and to select the correct one.

Accordingly, there has developed a substantial need for a more accurate OCR apparatus and OCR method. Preferably, such apparatus and method would not require excessive memory or complicated operations.

We have discovered that existing OCR apparatus and methods can be substantially improved by using image equivalents. When an OCR scans a document, it forms a bit mapped image of the document, including images of the words and the characters within the words. Such images are normally discarded after a reference character is recognized by the OCR. We have discovered that one may use the images generated by the OCR to improve the accuracy of the OCR. So, images on the document that are equivalent comprise identical characters. If the OCR identifies characters within equivalent images as different from one another, then the OCR is corrected to reconsider its recognition of characters and to consistently identify equivalent images with the same characters.

The invention provides a system and method for recognizing words in a text on a medium. The system includes an optical character recognition apparatus that scans the medium, such as the document, and generates bit mapped images of characters that form words on the medium. In accordance of generating such bit mapped images of characters, an image comparator compares a bit mapped image of one set of characters to bit mapped images of other characters. Equivalent images are collected in clusters. When two images are equivalent, there is an underlying assumption that they will have the same characters. The OCR performs its usual function of breaking down the bit mapped image, parsing it into words and characters and then comparing bit mapped character images to reference characters. These identified reference characters are then inserted into words. At this point, the results of the image comparator and the reference character recognizer are compared. If the reference character recognizer identifies identical characters for all of the equivalent images in a cluster, then there is a high likelihood that the OCR has an accurate match and the reference characters for the word are output. However, if the characters identified by the reference recognizer are different for equivalent words in a cluster, then further image processing resolves the differences between the reference character recognizer and the image comparator.

In the preferred embodiment, images are clustered into equivalents of each other. The images are sets of pixels and each pixel has a binary value of 1 or 0. The pixels of the first word are compared to corresponding pixels of each equivalent word. A first counter counts the number of OR signals where one of the pixels of either the first word image or an equivalent word image has a binary value of 1. A second counter counts the number AND signals where pixels in the first word and a corresponding pixel in an equivalent image both have a value of 1. The OR signal count is divided by the AND signal count to provide a measurement of equivalence between the image of the first word and the equivalent image. Those skilled in the art will recognize there are other techniques to determine equivalence between images.

It is a feature of the invention that one may test for equivalence between a word and a second word or a portion of the second word. The portion of the second word may include a suffix, a prefix, or a portion of the second word disposed between the first and the last character. Where there is a disagreement between the word recognizer and the equivalent images regarding the characters in the first word, the OCR is adjusted to select the reference characters that comprise the majority of equivalent images having the same reference characters. The results of the OCR are further processed to identify the font of the images, and to decompose a first word into subimages so that subimage equivalents may be compared in order to modify the OCR results. Finally, the entire medium may be subjected to a re-recognition operation where all of the images are decomposed into subimages, a lattice is generated of overlapping subimages by voting, font learning and verifying. The OCR will determine the probability for each path through the generated lattice and will select the path with the highest probability and thereby output a word corresponding to the path with the highest probability.

Having summarized salient features of the invention, further references made to the attached drawings and to the following detail description.

BRIEF DESCRIPTION OF THE DRAWINGS

FIG. 1 shows candidate sets for sample sentence.

FIG. 2 shows word candidates for two sentences with a common word.

FIG. 4 shows samples of inter-word related images.

FIG. 5 shows images of inter-word relationships in a passage of text.

FIG. 6 is a computer program for word image clustering.

FIG. 7 is a computer program for determining words that have a subimage relationship.

FIG. 8 is a computer program for detecting whether one image is a subimage of another.

FIG. 9 is a computer program for left-part matching between two images.

DETAILED DESCRIPTION

Figure 3:
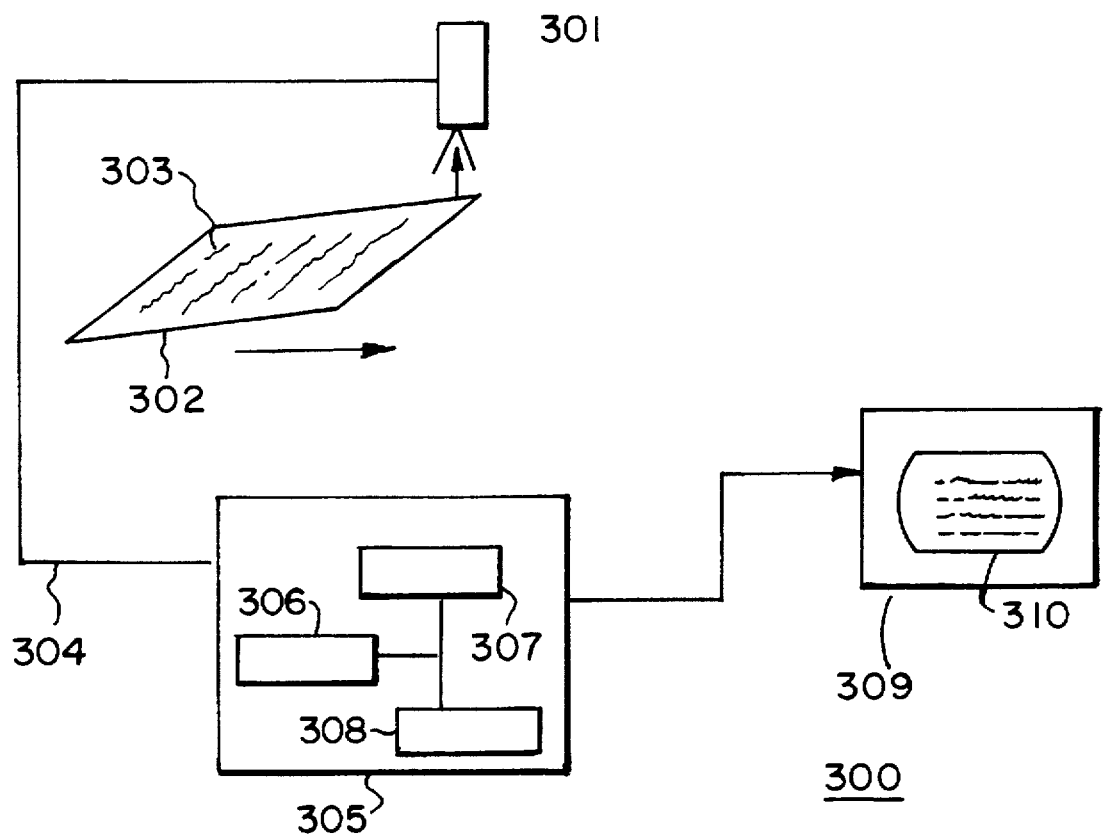
FIG. 3 is a block diagram of an OCR using the invention.

With reference to FIG. 3, there is a shown an OCR system 300 where medium, typically a document 302 having text 303 on that passes beneath an image digitizing device 301. The image digitizing device 301 may be any suitable image digitizer such as a charge couple device (CCD) camera or a CCD line array. The digitizer 301 outputs signals representative of the image via signal line 304 to the OCR 305. OCR 305 has a central processing unit (CPU) 306 which may have an analog to digital converter as part of its circuitry. As an alternative, the digitizing device 301 may convert analog signals into digital format for processing by the CPU 306. The CPU 306 operates in accordance with one or more programs that are generally stored in a memory, such as RAM 307 or ROM 308. ROM 308 generally includes operating systems for controlling the normal operation of the CPU 306. RAM 307 contains application programs for operating the CPU in accordance with a desired application. In the embodiment of this invention, it is envisioned that RAM 307 will store suitable programs for operating the CPU 306 in accordance with the steps outline hereinafter. Of course, the functions described hereinafter could be implemented by fashioning one or more integrated circuits.

CPU 306 receives a series of input pixel signals having a value of 1 or 0. Those skilled in the art will appreciate that the analog output signals of the digitizer 301 may be suitably thresholded by further circuitry (not shown) in order to provide binary signals of "0" or "1". A "0" represents a background portion of the document 302 in the area of a pixel. A "1" value represents a portion of text that appears in the pixel. The CPU stores in the RAM a bit mapped image of binary values corresponding to the image on the document 302. In normal operation, the bit mapped image stored in RAM 307 is suitably parsed and divided into character images. The character images are then compared to reference characters including reference characters of letters and numbers. The CPU 306 compares each bit mapped character image to bit mapped reference character images. Based upon that comparison, the microprocessor 306 will indicate that a given character image corresponds to a reference image. The CPU 306 will also indicate the degree of confidence of the match by giving a numerical score for the accuracy of a character and a score for the accuracy of a word. Accordingly, the character images are each assigned a reference image. The reference images also correspond to a ASCII code which is then stored in the RAM as representative of a letter or number corresponding to the character image. Thereafter, one may output the ASCII code information to a suitable display device such as a CRT 309 where the image 310 is representative of the ASCII codes identified by the optical character recognition system 305. When the OCR 305 operates perfectly, each letter and number appearing on image 310 corresponds to the letters and numbers appearing in the text 303 of document 302. However, the OCR 305 often makes mistakes and the invention will enhance the output of the OCR 305.

OCR 305 first operates on the bit mapped image to divide it into individual images corresponding to words. A word image is selected by typical parsing techniques. The CPU 306 generates signals representative of the location of a boundary box for each word. The coordinates of the corners of each boundary box are stored together with the bits inside the box in order to establish a sequential list of images (Image 1, Image 2, etc) with the corner coordinates for each image.

Turning again to FIG. 2, assume that the sentences shown therein are from the same text. By imaging matching, one knows that word images 2 and 16 are visually similar. If two word images are almost the same, they must be the same word. Therefore, identical candidates should be selected for word image 2 and word image 16. After "form" is chosen for image 16, it can also be chosen as the decision for image 2. With this invention, the visual, bit mapped image for word 2 and word 16 are equivalent to each other. We know that they are equivalent because in a true text, the correct word for the both word images is "form." Accordingly, the equivalence between the word images can be used to select the proper characters for both words 2 and 16. In other words, both words 2 and 16, since they have equivalent bit mapped images, should have identical characters. Thus, it would be clearly erroneous to select "farm" for word 2 and then select "foam" for word 16.

We have discovered that the images of words have a relationship to one another. The relationships are six in number and are defined in Table 1. Examples of these relationships are shown in FIG. 4.

TABLE 1

Word relations at the image and symbolic levels.

Possible Relations between $W_1$ and $W_2$

| | at image level | at symbolic level |
|---|---|---|
| 1 | $W_1 \approx W_2$ | $W_1 = W_2$ |
| 2 | $W_1 \approx$ subimage_of($W_2$) | $W_2 = X \cdot W_1 \cdot Y$ |
| 3 | left_part_of($W_1$) $\approx$ left_part_of($W_2$) | prefix_of($W_1$) = prefix_of($W_2$) |
| 4 | right_part_of($W_1$) $\approx$ right_part_of($W_2$) | suffix_of($W_1$) = suffix_of($W_2$) |
| 5 | right_part_of($W_1$) $\approx$ left_part_of($W_2$) | suffix_of($W_1$) = prefix_of($W_2$) |
| 6 | subimage_of($W_1$) $\approx$ subimage_of($W_2$) | $W_1 = X_1 \cdot Y \cdot Z_1$ and $W_2 = X_2 \cdot Y \cdot Z_2$ |

Note: "$\approx$" means approximately match at image level; "·" means concatenation.

Relation number one describes two images that are equivalent. An example of this is shown in part 1 of FIG. 4. This relation occurs often in normal English text where the same word is used many times in a single passage. Relation number two defines the occurrence of a subimage. That is, one word is entirely contained in another. Relations there through five define the left_part_of and right_part_of relations. These occur often because of the use of common prefixes and suffixes. Relation number six defines the occurrence of a subimage from one word as the subimage of another.

The primary characteristic used in the applicative program for operating OCR 305 is that the existence of a visual inter-word relation implies the existence of a symbolic equivalence. That is, if a portion of one word is equivalent to a portion of another word, the recognition results for the corresponding portions of those words must be the same.

The program described herein takes advantage of this characteristic to improve OCR 305 performance. One part of the program determines the occurrence of the six visual relations in a document image. A postprocessing program then uses the visual relations within the document to correct for recognition errors in a portion of one word that are impossible given that it has a certain visual relation with another word that has been recognized differently.

An example some of the visual inter-word relations in a small segment of text is shown in FIG. 5. Word image 5 (its identity is "the") matches the middle part of word image 6 (its identity is "hypothesis"); word image 9 (its identity is "biological") matches the left part of word image 1 (its identity is "biologically"); and word image 8 (its identity is "are") matches the right part of word image 11 (its identity is "share").

Program for Detecting Visual Inter-Word Relations

The computer Program 600 of FIG. 6 operates OCR 305 to detect the six visual inter-word relations. Program 600 is composed of six separate steps. First, the whole-word equivalence relation is detected by an image clustering step. Image prototypes from each cluster (i.e., the average of the word images in the cluster) are then compared in five separate steps that determine the other five relations (including the subimage, as well as the various left art_of and right_part_of relations). The prototypes are used since the averaging step is effective at removing uniform noise and generating a better quality image than any of the individual words.

Whole-Word Clustering Program

The whole-word clustering program is described in FIG. 6. An agglomerative technique is used in which each image is compared to the list of current clusters using the metric defined above. If the current word is not sufficiently similar to any of the available clusters, a new cluster is started. This process is continued until all the words have been processed. After clustering, any two word images in the same cluster are defined to be equivalent and thus hold relation number one with each other.

In step 601 the queue is set as an empty set. Next, in step 602, all the images (Image1, Image2, etc) are put into the queue. In step 603 an image cluster list is established. So long as there are images in the queue, the image at the top of the queue is matched to the prototype of each cluster. Step 605 selects the next image from the queue and step 606 adds like images to a cluster with matching prototypes. The prototype for each cluster is an average of the images that are deemed to be equivalent to each other. So, if there are five images in a cluster, their total pixels are counted and averaged. When a new image is added, the prototype average is recalculated. If there is no prototype (e.g. at the start of the program), step 608 creates a new cluster of one images. The degree of equivalence is under control of the operator. One technique for determining equivalence will be explained hereinafter, but those skilled in the art will recognize that there are numerous methods for comparing one image to another to judge equivalence.

The equivalence between two binary images is calculated as described below. This metric is used in the word image clustering program described in FIG. 4 in the if statement where it is determined whether an image matches with a prototype. Let A and B be two m×n binary images. Inside an image, "1" and "0" denote "black" and "white" pixels respectively. We measure visual similarity between A and B as $$r(A,B) = \frac{\sum_{i=1}^{m} \sum_{j=1}^{n} (Aij \wedge Bij)}{\sum_{i=1}^{m} \sum_{j=1}^{n} (Aij \vee Bij)}$$

where "∧" and "∨" are and and or operators respectively. The higher the measurement r is, the better two images match. When two images, A and B, are slightly different in size, the similarity between them is defined by the maximal matching obtained if A is shifted over B. By setting a proper threshold $r_0$, it is defined that two images are visually equivalent if $r(A,B) > r_0$. Further heuristics on image size (rows and columns) as well as other visual characteristics such as projection histogram similarity are also used to suppress incorrect matches.

Finding Sub-pattern Relations

The other five visual relations are based on different types of sub-patterns. These relations are all detected by comparing portions of the prototypes from the clusters generated by whole-word clustering Program 700 that detects that one image is a subimage of another (presented in FIG. 7). This is done by comparing the cluster prototypes for shorter words to longer words using the IsSubImage metric defined below. If two clusters have the subimage relation to each other, the individual words in the clusters are marked with this information.

As a first step 701 the clusters are sorted by the width of their respective prototypes. The shorter images C are compared to the longer images D in step 705 to determine if the shorter image C is part of the large image D. In step 706, the fact is recorded that each word image x in cluster C is a subimage of each word image y in cluster D.

The IsSubImage comparison routine 800 used in the program of FIG. 7 is described in FIG. 8. Routine 800 in its first step 801 tests the two images, Image1 and Image for height. If Image1 is taller than Image2, there is no sub-image relationship. Otherwise, in step 805 Image1 is moved stepwise over Image2 to see if a match (step 806) is found.

The Left_Part_Of metric 900 is described in FIG. 9. It uses a binary search procedure that iteratively compares smaller portions of the left sides of two images until a match is found. Initially, half of the shorter word is compared to the left side of the longer word since if the shorter word were completely contained in the longer word this would have been detected by the IsSubImage metric 800. The Right_Part_Of metric (not shown) is a simple extension of the Left_Part_Of metric 900.

In the Left_Part_Of metric 900 Image1 and Image2 are examined to see whether their left sides match. The metric 900 sequentially divides each image in half (step 902) and compares the left half of the Image1 to the left half of Image2. If there is a match (step 903), that match is recorded as such. Otherwise, the process is repeated on the two images until the first bit mapped character of Image1 is compared to the first bit mapped character image of Image2.

OCR Postprocessing With Visual Inter-Word Relations

A four-step program post processes OCR results using visual inter-word relations. The objective of the first three steps is to locate word decisions that are correct with high confidence. The first step uses the equivalence relation between words in a cluster to do this and the third uses the sub-image relation between words in different clusters. In the course of locating such high confidence decisions, some OCR errors are corrected. These high confidence word decisions are then used to learn images that correspond to individual characters and character sequences. These images are then used to decompose the remaining word images and generate new recognition results for them. Details of the four steps are presented below.

In the first step, a voting procedure is used on the whole-word clusters. The word decisions from clusters that contain two or more words are inspected and if a majority of them agree, that decision is output for the words in that cluster.

Figures 10, 11:
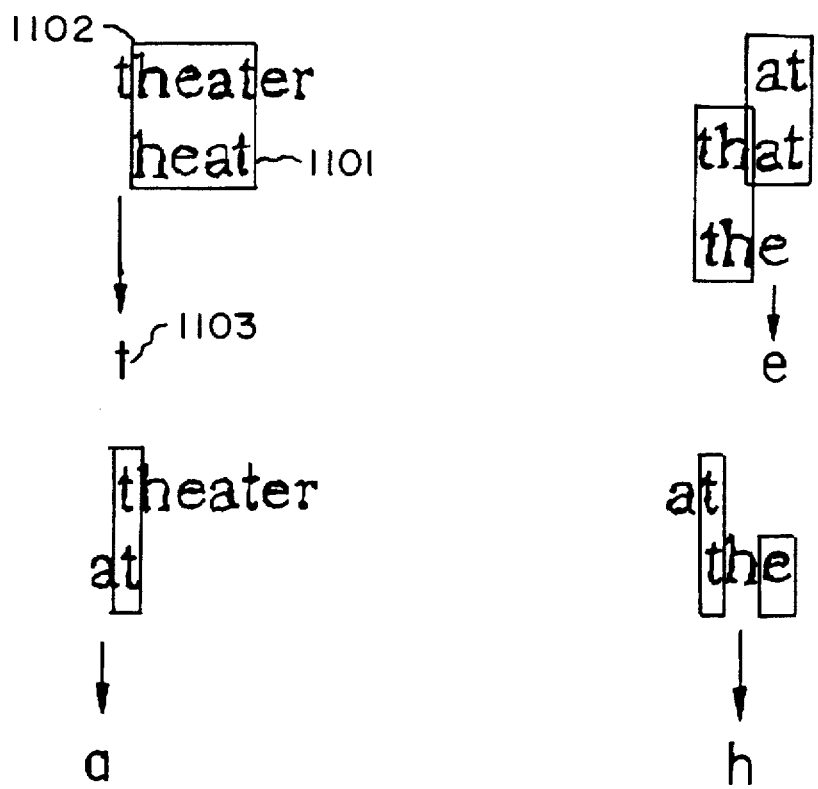
FIG. 10 is an example of a voting step.
FIG. 11 is an example of a font learning step.

FIG. 10 shows an example of a cluster of six instances of the word "the". Five of them were recognized correctly and one of them was incorrect (the word die). This error is corrected by voting. Experience has shown that voting produces very reliable performance for about half the words in a document.

In the second step, a font learning method is performed in which the visual interword relations are used to decompose the prototypes for the clusters that voting produced decisions for. This results in image prototypes for many individual characters.

An example of how the visual interword relations are used to decompose a word image is shown in FIG. 11. In font learning, reliable clusters are used to isolate and identify individual character images. So, cluster 1101 comprises a reliable prototype of the word "heat." The cluster 1101 is removed from the image of "theater" to isolate the "t" at the beginning of the word. When the cluster is removed, the image of "t" is recognized by the reference bit mapped image for "t" So, font learning is used to decompose images into individual characters and then identify individual character images as one of the reference characters. So, the characters with the particular font used for the text 303 are recognized as images. With these images stored as recognized characters, any questionable individual characters may then be compared to equivalent character images that have been reliable identified during font learning.

In the third step, a verification program is executed on the word images that voting was unable to make a decision on. Visual inter-word relations are calculated between each image and the prototypes for the clusters output by voting. A word image is "verified" if its decomposition into sub-patterns is mapped onto ASCII decisions that agree with the original OCR result. An OCR error can also be corrected in this step if there are high confidence visual inter-word relations between the input image and portions of the cluster prototypes found during voting. The verification step processes each word in a cluster sequentially and generates a list of alternatives for all the words in the cluster. This is done by appending the verified results for each word.

Figure 12:
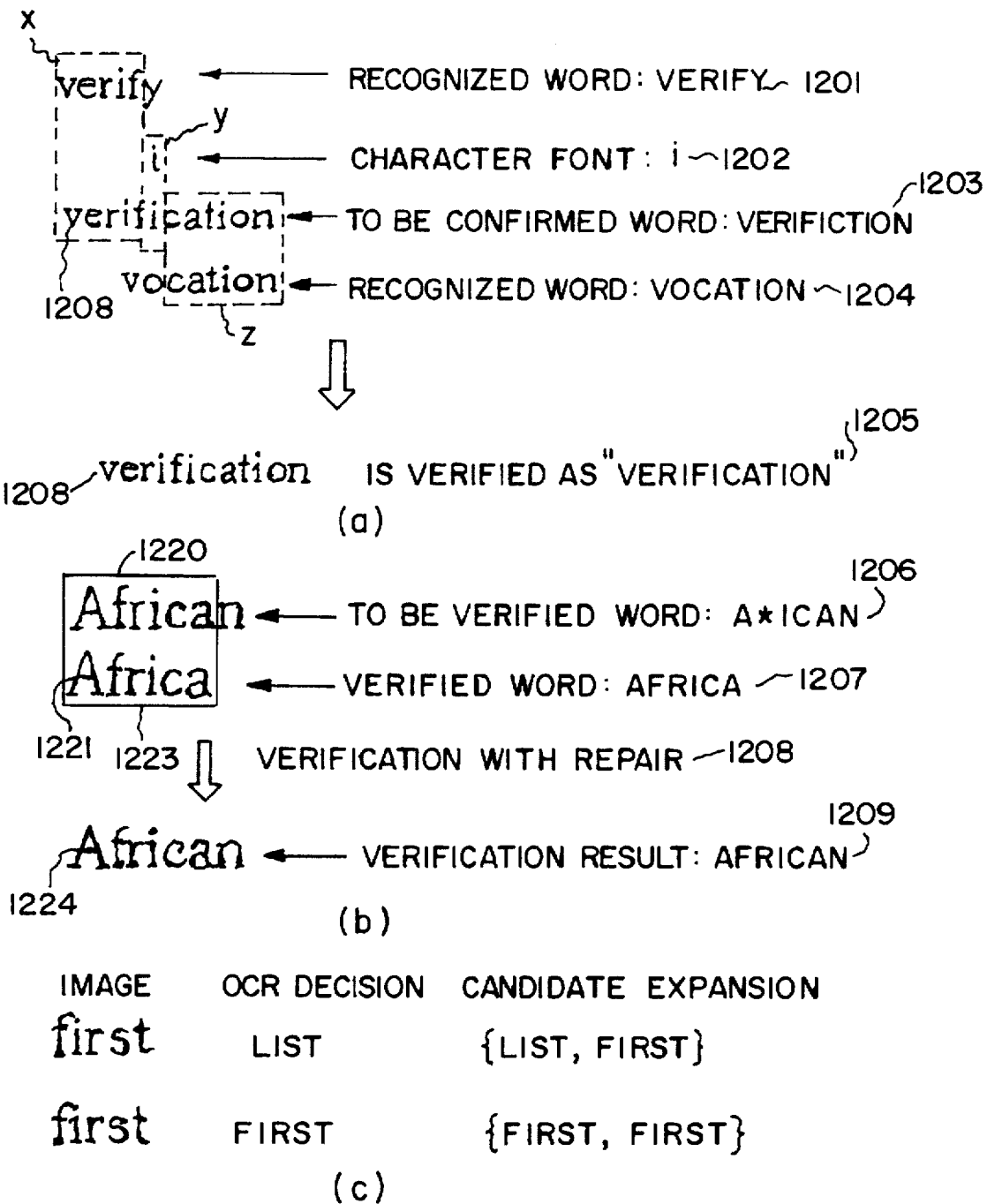
FIG. 12 has examples of verifying steps.

An example of verification is shown in FIG. 12. The candidate word was "verification" and was not recognized by the original OCR character recognition and dictionary comparison. The image 1208 for "verification" was decomposed into three parts: x, y, and z that were sub-parts of other images that were located by the voting step. The OCR result was verified because the decisions for those sub-parts covered the entire word image and the decisions agreed with the OCR result.

Another feature of the verification step is its ability to repair damaged words. The image 1220 is incorrectly recognized. When its left hand side is compared to a verified image 1221, then the image 1220 can be correctly identified as shown at 1224.

In the fourth step, a re-recognition procedure is executed on all the remaining word images. Every such image is decomposed into sub-parts using visual relations calculated from the images output by voting, font learning, and verification. This produces a lattice of possibly overlapping sub-images along with their OCR results. Then all the paths through this lattice are computed by CPU 305 and each path is provided with a score that measures the degree to which each sub-image in the path matches the original word image. All the complete paths that also occur in a dictionary are placed in the candidate list for the word and the complete path with the best cost is output. Appropriate thresholds are incorporated in the program so that character strings not in the dictionary may also be output.

Figure 13:
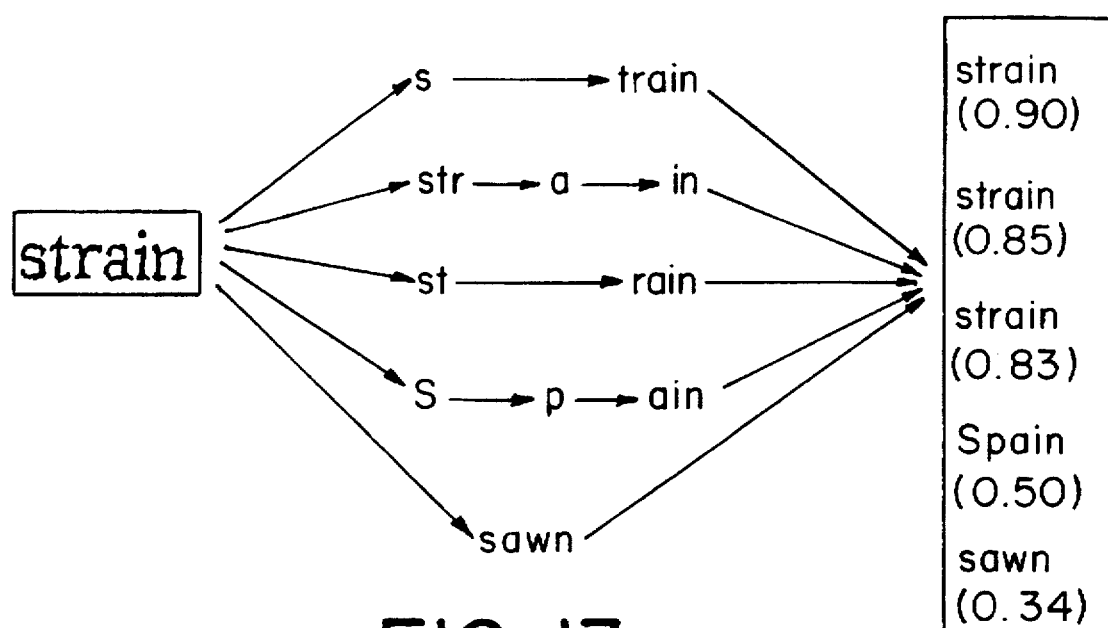
FIG. 13 is an example of a re-recognition step.

An example of re-recognition is shown in FIG. 13. The decomposition produced by comparing the input image to the other word images output by voting, font learning, and verification. Overall there are N complete paths that cover the entire word image. These paths along with their strings of ASCII decisions and cumulative matching scores are shown in the second part of FIG. 13. Each of those paths is looked up in a dictionary and the complete path with the minimum cost (best match) is output. In the example shown, this changes the original OCR decision from X to &.

Experimental Results

An experimental system was developed to test the postprocessing program discussed above. The input to this system is the output from a commercial OCR (i.e., Caere's AnyFont package) as well as the page images that were provided to the OCR. The commercial device provides at least a single decision for each word and in cases where it is unsure, several alternatives are produced. Also, the bounding box coordinates for each word are output.

Six page images (listed in Appendix 1) were used to test the system. These were scanned at 300 ppi and the binary image produce by the scanning hardware was used. Uniform noise was added to each image using the documentation degradation model (DDM) package from the University of Washington. The parameter set for DDM was (820, 0.0, 1.0, 1.0, 1.0, 1.0, 3).

The accuracy of Caere's AnyFont OCR package on original pages is very high, more than 98% correct at the word level. After adding uniform noise with DDM, the word correct rate dropped to 73.5%. It was observed that the word alternatives produced by the OCR do not improve performance significantly (see Table 3).

Word clustering was then computed using the bounding boxes output by the OCR and inter-word relations were calculated between pairs of clusters. In the present implementation, only the first four visual relations in Table 1 were used. The threshold for imaging matching, $r_0$, was set to 0.60.

Table 2 shows the result of visual inter-word relation analysis. On average, about half of words are in large clusters (containing two or more word images). The number of visual inter-word relations is large and varies from page to page.

After applying the proposed postprocessing system, the word images are divided into three set: voting, verification and re-recognition. The system generates one decision for each word in the voting set and there are no other candidates for each word. The accuracy of the words in the voting set was improved from 92.2% to 98.0%. The accuracy of the words in the verification set was improved from 83.1% to 88.5% and the correct rate of the word alternatives was improved from 83.3% to 93.3%.

The correct rate of the words in the combination of the voting and verification sets was improved from 85.6% to 92.3% and the accuracy of their alternative lists was improved from 86.9% to 95.2%. It is important to note that the images in these sets account for about 71% of the words in the original text pages.

The complete re-recognition step is still under development. At the present time, only the generation of alternatives by tracing paths through the lattice has been implemented. This increased the accuracy of the candidate lists from 44.1% to 52.6%.

TABLE 2

Results of visual inter-word relation analysis.

| page id. | # of words | # of clusters | # of large clusters | # of words in large clusters | # of visual inter-word relations btw clusters (type-2,3,4) |
|---|---|---|---|---|---|
| $P_1$ | 827 | 520 | 96 | 403 | 4269 |
| $P_2$ | 1129 | 690 | 139 | 578 | 7917 |
| $P_3$ | 826 | 494 | 90 | 422 | 17406 |
| $P_4$ | 535 | 389 | 45 | 191 | 8784 |
| $P_5$ | 686 | 467 | 78 | 297 | 14358 |
| $P_6$ | 1019 | 607 | 113 | 525 | 25745 |

TABLE 3

Results of postprocessing.

| word set | # of words | OCR decision corr. rate | OCR corr. rate of candidate list | avg. # of candidate | Postprocessing decision of corr. rate | Postprocessing corr. rate candidate list | avg. # of candidates |
|---|---|---|---|---|---|---|---|
| voting | 1403 | 1293 92.2% | 1298 92.5% | 1.6 | 1375 98.0% | 1375 98.0% | 1.0 |
| verification | 2160 | 1752 81.1% | 1799 83.3% | 2.6 | 1912 88.5% | 2016 93.3% | 3.2 |
| rerecognition | 1459 | 644 44.1% | 675 46.3% | 3.1 | 644 44.1% | 768 52.6% | 2.4 |
| voting + verification | 3563 | 3050 85.6% | 3097 86.9% | 2.5 | 3287 92.3% | 3391 95.2% | 2.4 |
| voting + verif. + re-recog. | 5022 | 3694 73.5% | 3772 75.1% | 2.6 | 3931 78.3% | 4159 82.8% | 2.3 |

In general, the invention can be adapted to improve the recognition results of a recognizer that captures images of an item to be recognized and analyzes portions of the capture images to recognize discrete sub-components of the images. As such, the invention applies to an online handwriting digitizer that captures the coordinates of handwritten characters and letters and compare the captured image defined by the coordinates to reference characters and reference letters. In the course of digitizing the input, the digitizer has an image of the handwriting of the user. That image can be used to post-process results of the digitizer by comparing the reference characters identified by the digitizer with the image analysis provided by the invention. Such image comparison is carried out in a manner similar to the manner described above in connection with OCR 300. Related areas of application for the invention also include computer vision and robotic vision.

The invention could likewise be applied to speech recognizers. Speech recognizers are designed to recognize spoken words. One problem with speech recognition is identifying and correcting for an accent. Frequently words spoken with a accent will be falsely recognized as another word spoken without the accent or not recognized at all. However, if images of candidate words were post processed against the reference words, then equivalent oral images could be used to correct and enhance speech recognition. The spoken words are a series of oral images. The speech recognizer breaks the oral images down into recognizable reference components and then outputs the recognized reference components as candidate words. The theory of operation is thus similar to the theory of operation of an OCR. With the invention, the stored oral images can be collected into clusters of identical images of the oral input signals. In this regard, speech can be digitized in a manner similar to the digitization of text. After initial recognition is competed, the candidate words are post processed against the dusted oral digitized equivalent images to make sure that the same oral words and characters for equivalent image are identical. If not, then there can be a majority vote, verification, and recognition as described above.

Figure 14:
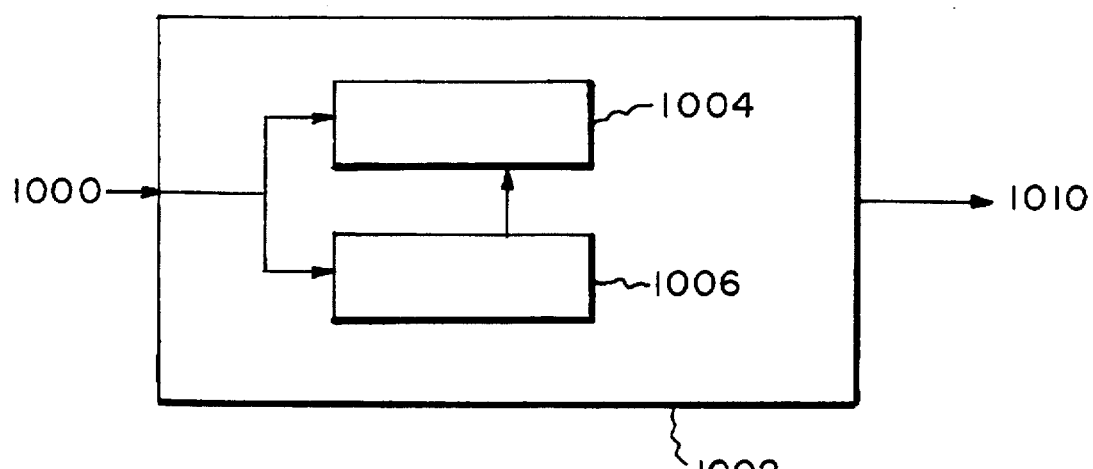
FIG. 14 is a block diagram showing a general system using the invention.

In its broader aspects the invention, as shown in FIG. 14, applies input signals 1000 to a signal recognizer 1002. The recognizer 1002 has an image analyzer 1004 that generates and stores clusters of equivalent signal images. Equivalent signal images are signals that look or sound identical to each other. The recognizer 1002 also has a comparator 1006 that segments the input signals into smaller signals that can be compared to reference signals. The comparator 1006 then compares the input signals to the reference signals to identify each input signal as one of said references signals. The identified reference signals are them compared to the clustered images to confirm the reference signals or to correct he reference signals by majority voting in accordance with the clusters, verification and re-recognition. The recognized signals are output as 1010.

What we claim is:

1. A method for recognizing words in a text on a medium comprising the steps of:
    scanning the medium to generate bit mapped images of characters forming the words on the medium,
    comparing a bit mapped image of a first number of bit mapped characters in a first word to one or more bit mapped images of characters in other words in order to identify equivalent bit mapped images in said document;
    comparing the equivalent bit mapped images of the document to reference characters in order to recognize each bit mapped character as one of said reference characters;
    comparing the corresponding recognized reference characters of each equivalent image to each other and selecting the reference characters identified for the equivalent bit mapped characters when the same reference characters are identified for corresponding bit mapped characters in said equivalent images; and
    further processing said bit mapped images when different reference characters are recognized for corresponding equivalent bit mapped characters.

2. The method of claim 1 wherein equivalent images are clustered.

3. The method of claim 2 wherein clustering comprises the steps of digitizing the images of the first word and the equivalent word images into a plurality of sets of pixels, each pixel having a binary values of one or zero;
    generating a count of or signals by comparing the pixels of the first word image to each corresponding pixel in each equivalent image to count the number of pixels where at least one of the compared pixels has a binary value of one;
    generating a count of and signals by comparing the pixels of the first word image to each corresponding pixel of equivalent images to count the number of pixels where both of the compared pixels have a binary value of one;
    determining equivalence by the ratio of the count of and signals to the count of or signals.

4. The method of claim 1 wherein the bit mapped image of one word is compared to bit mapped images of other words to determine equivalence.

5. The method of claim 1 wherein the bit mapped image of a first word is compared to a bit mapped image of a portion of a second word to determine equivalence between the first word and the portion of the second word.

6. The method of claim 5 wherein the portion of the second word is a prefix in said second word.

7. The method of claim 5 wherein the portion of the second word is a suffix in said second word.

8. The method of claim 5 wherein the portion of the second word is disposed between the first and the last character in the second word.

9. The method of claim 1 further comprising the step of selecting the reference characters for the first word in accordance with the reference characters comprising a majority of the equivalent images having the same recognized reference characters.

10. The method of claim 9 further comprising the step of
    decomposing the bit mapped image of the first word into its characters and matching images of a first character to a second character to determine a font for the matched images.

11. The method of claim 9 further comprising the step of
    decomposing the bit mapped image of a first word into two or more sub-images;
    comparing the sub-images of the first word to images of other characters of other words to identify equivalent images for the sub-images of the first word;
    comparing the equivalent images to reference words, reference word portions and reference characters to verify that the image of the first word corresponds to the most likely correct reference word.

12. The method of claim 11 further comprising re-recognizing the images on the medium, including the steps of
    decomposing each image in to sub-images corresponding to other images recognized in the medium;
    generating a lattice of overlapping sub-images by voting, font learning and verifying;
    determining a relative score for each path through said lattice;
    selecting the path with the highest score and outputting a reference word corresponding to the path with the highest score.

13. A system for recognizing words in a text on a medium comprising:
    an optical character recognition machine for scanning the medium and generating bit mapped images of characters forming the words on the medium;
    an image comparator for comparing a first bit mapped image of a first number of characters in one word to one or more bit mapped images of characters in other words in order to identify equivalent bit mapped images of said first bit mapped image;
    a reference character recognizer for comparing the equivalent bit mapped images to reference characters in order to recognize each bit mapped character as one of said reference characters;
    means for comparing the corresponding recognized reference characters of each equivalent image to each other and selecting the reference characters identified for equivalent bit mapped characters when the same reference characters are identified for corresponding bit mapped characters in said equivalent bit mapped images; and
    means for further processing said bit mapped images when different reference characters are recognized for corresponding bit mapped characters in said equivalent bit mapped images.

14. The system of claim 13 further comprising means for clustering equivalent images.

15. The system of claim 13 wherein the means for clustering comprises means for digitizing the images of the first word and digitizing equivalent word images into sets of pixels, each pixel having a binary values of one or zero;

means for counting a first number or signals by comparing the pixels of the first word image to each corresponding pixel in each equivalent image and counting the number of pixels where at least on of the compared pixels has a binary value of one;

means for counting a second number of signals by comparing the pixels of the first word image to each corresponding pixel of equivalent images and counting the number of pixels where both of the compared pixels have a binary value of one;

means for determining equivalence in accordance with a ratio of the count of and signals to the count of or signals.

16. The system of claim 13 wherein the bit mapped image of one word is compared to bit mapped images of other words to determine equivalence.

17. The system of claim 13 wherein the bit mapped image of a first word is compared to a bit mapped image of a portion of a second word to determine equivalence between the first word and the portion of the second word.

18. The system of claims 17 wherein the portion of the second word is a prefix in said second word.

19. The system of claims 17 wherein the portion of the second word is a suffix in said second word.

20. The system of claim 17 wherein the portion of the second word is disposed between the first and the last character in the second word.

21. The system of claim 13 further comprising means for selecting the reference characters for the first word in accordance with the reference characters comprising a majority of the equivalent images having the same recognized reference characters.

22. The system of claim 21 further comprising means for decomposing the bit mapped image of the first word into its characters and matching images of a first character to a second character to determine a font for the matched images.

23. The system of claim 21 further comprising the step of means for decomposing the bit mapped image of a first word into two or more sub-images;

means for comparing the sub-images of the first word to images of other characters of other words to identify equivalent images for the sub-images of the first word;

means for comparing the equivalent images to reference words, reference word portions and reference characters to verify that the image of the first word corresponds to the most likely correct reference word.

24. The system of claim 23 further comprising means for re-recognizing the images on the medium, including means for decomposing each image in to sub-images corresponding to other images recognized in the medium;

means for generating a lattice of overlapping sub-images by voting, font learning and verifying;

means for determining the score of each path though said lattice;

means for selecting the path with the highest score and outputting a reference word corresponding to the path with the highest score.

* * * * *